United States Patent
Nan et al.

(10) Patent No.: US 9,756,613 B2
(45) Date of Patent: Sep. 5, 2017

(54) TRANSMISSION AND RECEPTION TIMING FOR DEVICE-TO-DEVICE COMMUNICATION SYSTEM EMBEDDED IN A CELLULAR SYSTEM

(71) Applicant: QUALCOM Incorporated, San Diego, CA (US)

(72) Inventors: Mingkai Nan, Beijing (GB); Hua Wang, Bridgewater, NJ (US); Yan Li, Beijing (CN); Junyi Li, Chester, NJ (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 13/706,840

(22) Filed: Dec. 6, 2012

(65) Prior Publication Data

US 2014/0161095 A1    Jun. 12, 2014

(51) Int. Cl.
*H04W 24/02*     (2009.01)
*H04W 72/04*     (2009.01)
(Continued)

(52) U.S. Cl.
CPC ......... *H04W 72/04* (2013.01); *H04W 56/002* (2013.01); *H04W 76/023* (2013.01)

(58) Field of Classification Search
CPC ............................ H04W 24/02; H04B 1/7083
(Continued)

(56) References Cited

U.S. PATENT DOCUMENTS 7,535,383 B2    5/2009  Segall et al.
8,428,143 B2    4/2013  Schwarz et al.
(Continued)

FOREIGN PATENT DOCUMENTS

CN    101971571 A    2/2011
CN    102415194 A    4/2012
(Continued)

OTHER PUBLICATIONS

Chae H.S., et al, "Radio Resource Allocation Scheme for Device-to-Device Communication in Cellular Networks Using Fractional Frequency Reuse", School of Information and Communication Engineering Sungkyunkwan University,Oct. 2011,pp. 58-62.
(Continued)

*Primary Examiner* — Marsha D. Banks Harold
*Assistant Examiner* — Elton Williams
(74) *Attorney, Agent, or Firm* — James K. O'Hare

(57) ABSTRACT

A method, an apparatus, and a computer program product for wireless communication are provided. The apparatus determines at least one time-frequency resource among resources of a cellular communication system to be used for device-to-device (D2D) communication, identifies a propagated start point of a first portion of the at least one time-frequency resource, and begins transmission of the D2D signal from a transmission start point. The transmission start point is based on the propagated start point and a cellular communication system downlink timing offset to the propagated start point. The apparatus also identifies a propagated end point of a last portion of the at least one time-frequency resource and ends transmission of the D2D signal at a transmission end point. The transmission end point is based on the propagated end point and a cellular communication system downlink timing advance to the propagated end point.

85 Claims, 12 Drawing Sheets

(51) Int. Cl.
*H04W 76/02* (2009.01)
*H04W 56/00* (2009.01)

(58) Field of Classification Search
USPC .......................................................... 370/330
See application file for complete search history.

(56) References Cited

U.S. PATENT DOCUMENTS

| | | | |
|---|---|---|---|
| 2003/0039273 | A1 | 2/2003 | Jang |
| 2004/0208267 | A1* | 10/2004 | Lee ................. 375/354 |
| 2006/0209959 | A1 | 9/2006 | Sun |
| 2007/0230564 | A1 | 10/2007 | Chen et al. |
| 2007/0280098 | A1* | 12/2007 | Bhatt et al. .................. 370/208 |
| 2009/0016249 | A1* | 1/2009 | Li et al. ..................... 370/310.1 |
| 2010/0093364 | A1 | 4/2010 | Ribeiro et al. |
| 2010/0260093 | A1 | 10/2010 | Liu et al. |
| 2011/0106952 | A1 | 5/2011 | Doppler et al. |
| 2011/0110426 | A1 | 5/2011 | Kim et al. |
| 2011/0182280 | A1 | 7/2011 | Charbit et al. |
| 2012/0258706 | A1* | 10/2012 | Yu et al. ................ 455/426.1 |
| 2013/0016776 | A1 | 1/2013 | Boyce et al. |
| 2013/0051472 | A1 | 2/2013 | Wiegand et al. |
| 2014/0003387 | A1* | 1/2014 | Lee ................... H04L 5/001 370/330 |
| 2014/0057670 | A1 | 2/2014 | Lim et al. |
| 2014/0086153 | A1* | 3/2014 | Bontu et al. .................. 370/329 |
| 2014/0112180 | A1* | 4/2014 | Axmon et al. ............... 370/252 |

FOREIGN PATENT DOCUMENTS

| | | | | |
|---|---|---|---|---|
| EP | 1686744 A1 | 8/2006 | | |
| WO | WO-2008010007 A1 | 1/2008 | | |
| WO | WO-2009138820 A1 | 11/2009 | | |
| WO | WO-2010082114 A1 | 7/2010 | | |
| WO | WO-2011162572 A2 | 12/2011 | | |
| WO | WO 2012124924 A2 * | 9/2012 | ............ | H04L 5/001 |
| WO | WO-2012150815 A2 | 11/2012 | | |

OTHER PUBLICATIONS

International Search Report and Written Opinion—PCT/US2013/073519—ISA/EPO—May 8, 2014.
Co-pending U.S. Appl. No. 13/959,635, filed Aug. 5, 2013.
Guo L., et al., "SCE5: Results of Test 5.1.2 on Inter-Layer Inferred Prediction Mode", 13. JCT-VC Meeting; 104. MPEG Meeting; Apr. 18, 2013-Apr. 26, 2013; Incheon; (Joint Colloborative Team on Video Coding of ISO/IEC JTC1/SC29/WG11 and ITU-T SG.16); URL: http://wftp3.itu.int/av-arch/jctvc-site/,, No. JCTVC-M0308, Apr. 9, 2013 (Apr. 9, 2013), XP030114265.
Guo L., et al., "TE5: Results of Test 5.3.1 on Inter-Layer Inferred Prediction Mode", 12. JCT-VC Meeting; 103. MPEG Meeting; Jan. 14, 2013-Jan. 23, 2013; Geneva; (Joint Colloborative Team on Video Coding of ISO/IEC JTC1/SC29/WG11 and ITU-T SG.16); URL: http://wftp3.itu.int/av-arch/jctvc-site/,, No. JCTVC-L0266, Jan. 8, 2013 (Jan. 8, 2013), XP030113754.

* cited by examiner

US 9,756,613 B2

TRANSMISSION AND RECEPTION TIMING FOR DEVICE-TO-DEVICE COMMUNICATION SYSTEM EMBEDDED IN A CELLULAR SYSTEM

BACKGROUND

Field

The present disclosure relates generally to communication systems, and more particularly, to transmission and reception timing for device-to-device (D2D) communication embedded in a cellular communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for wireless communication are provided. The apparatus determines at least one time-frequency resource among resources of a cellular communication system to be used for device-to-device (D2D) communication, identifies a propagated start point of a first portion of the at least one time-frequency resource, and begins transmission of the D2D signal from a transmission start point. The transmission start point may be based on the propagated start point and a cellular communication system downlink timing offset to the propagated start point.

In another aspect, the apparatus identifies a propagated end point of a last portion of the at least one time-frequency resource and ends transmission of the D2D signal at a transmission end point. The transmission end point may be based on the propagated end point and a cellular communication system downlink timing advance to the propagated end point.

In a further aspect, the apparatus begins a D2D signal from a reception start point. The reception start point may be based on the propagated start point and a cellular communication system downlink timing receiving timeline offset (RTLO).

DETAILED DESCRIPTION

Figure 1:
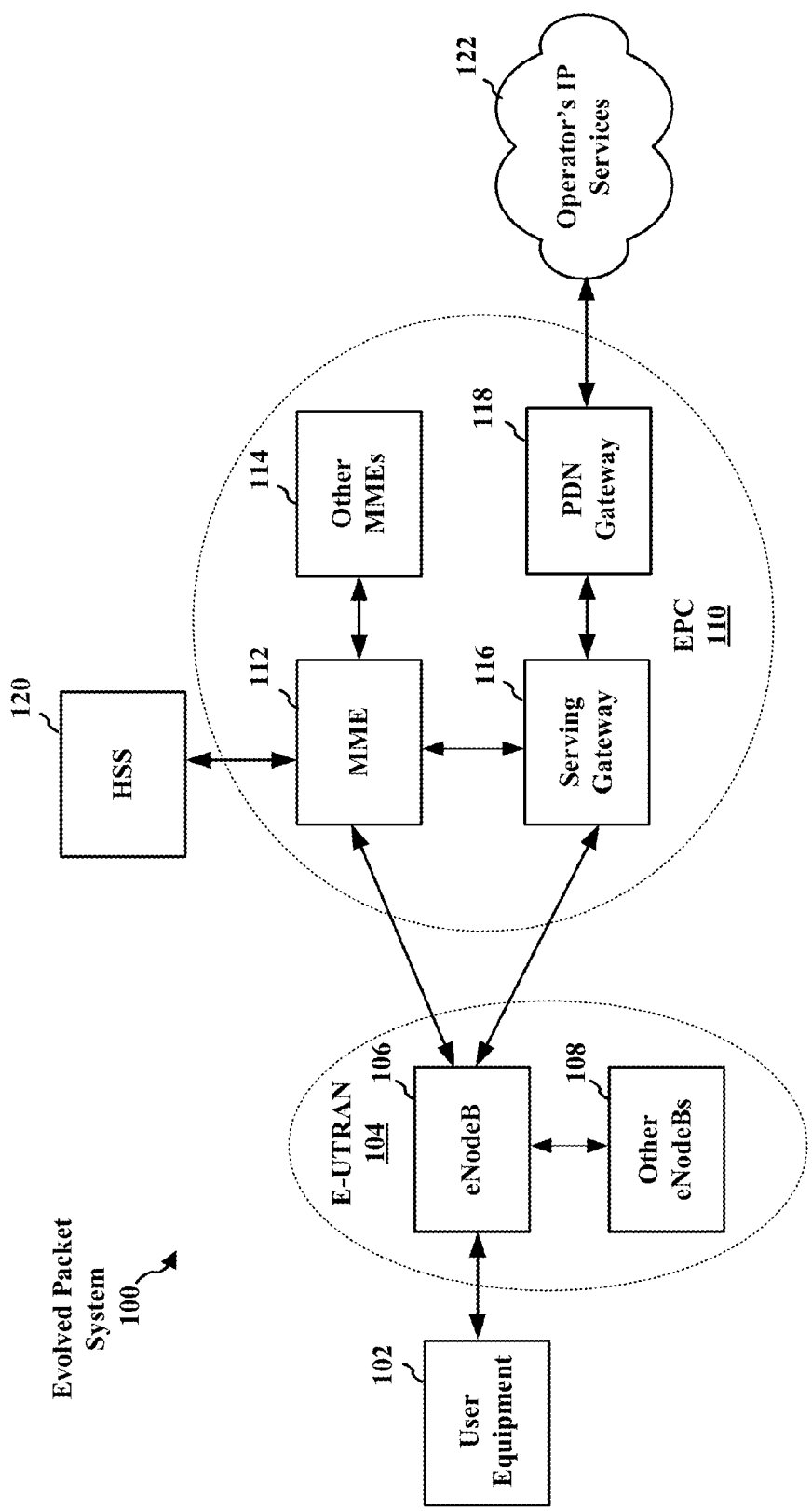
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
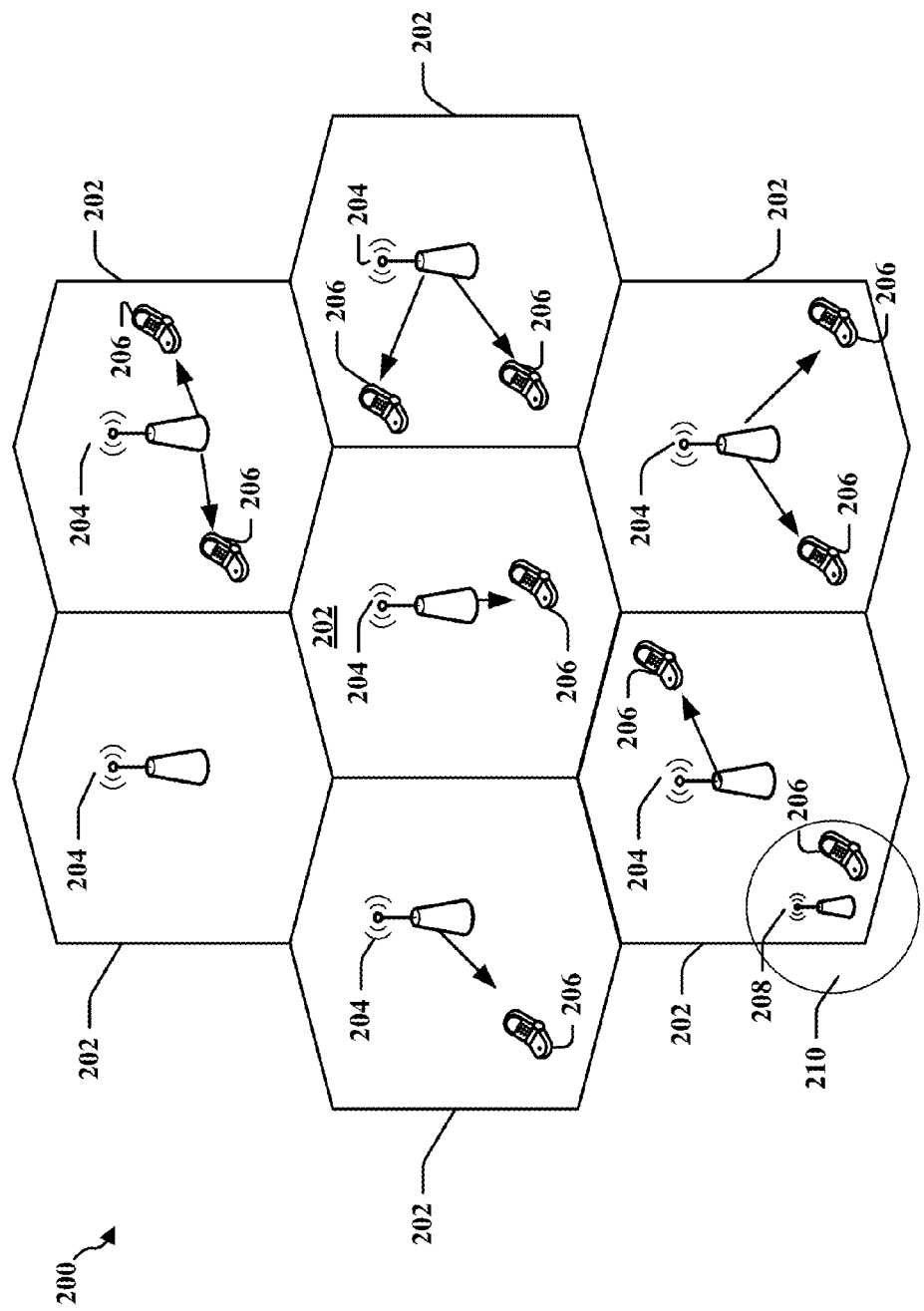
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
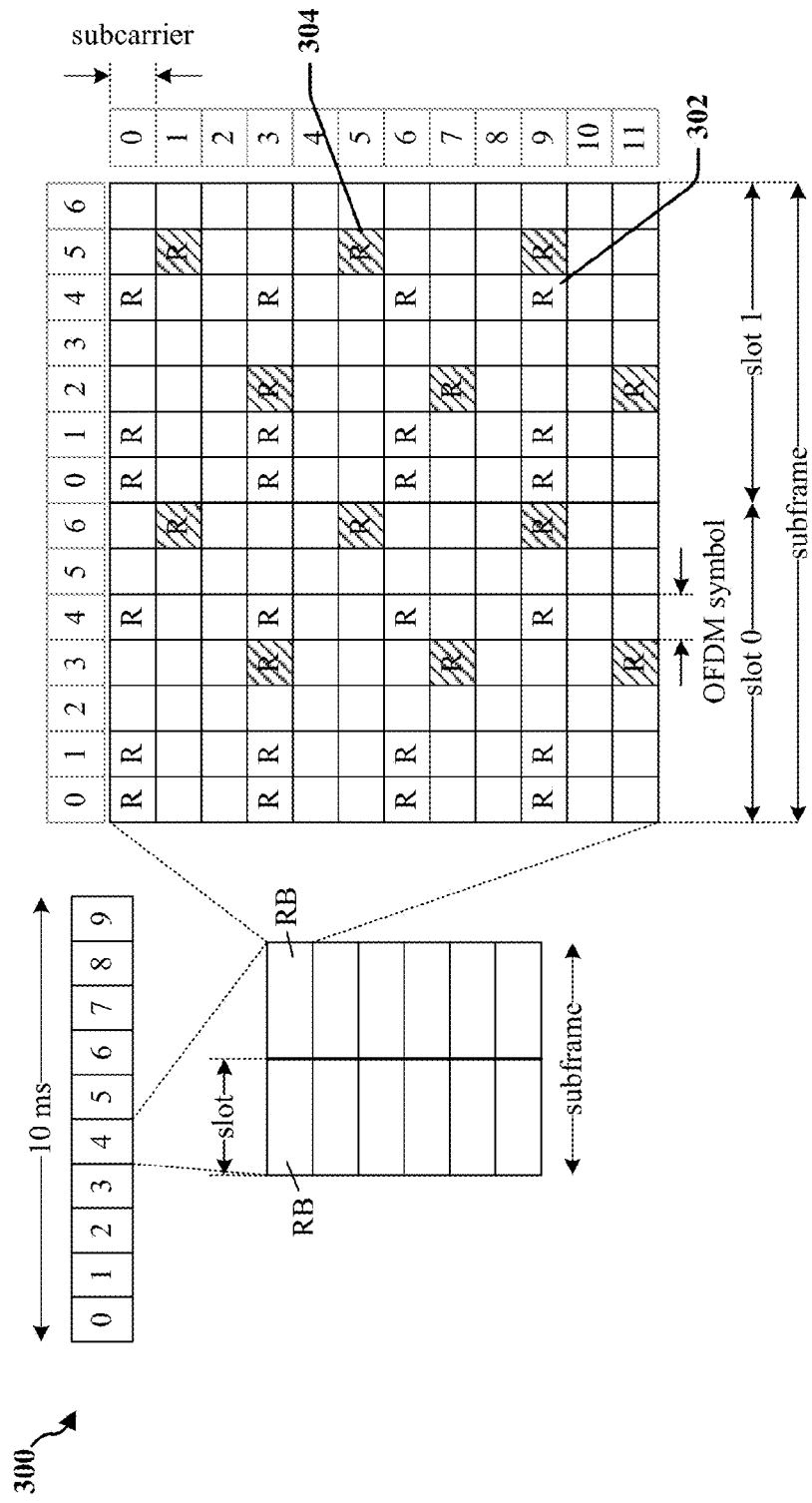
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
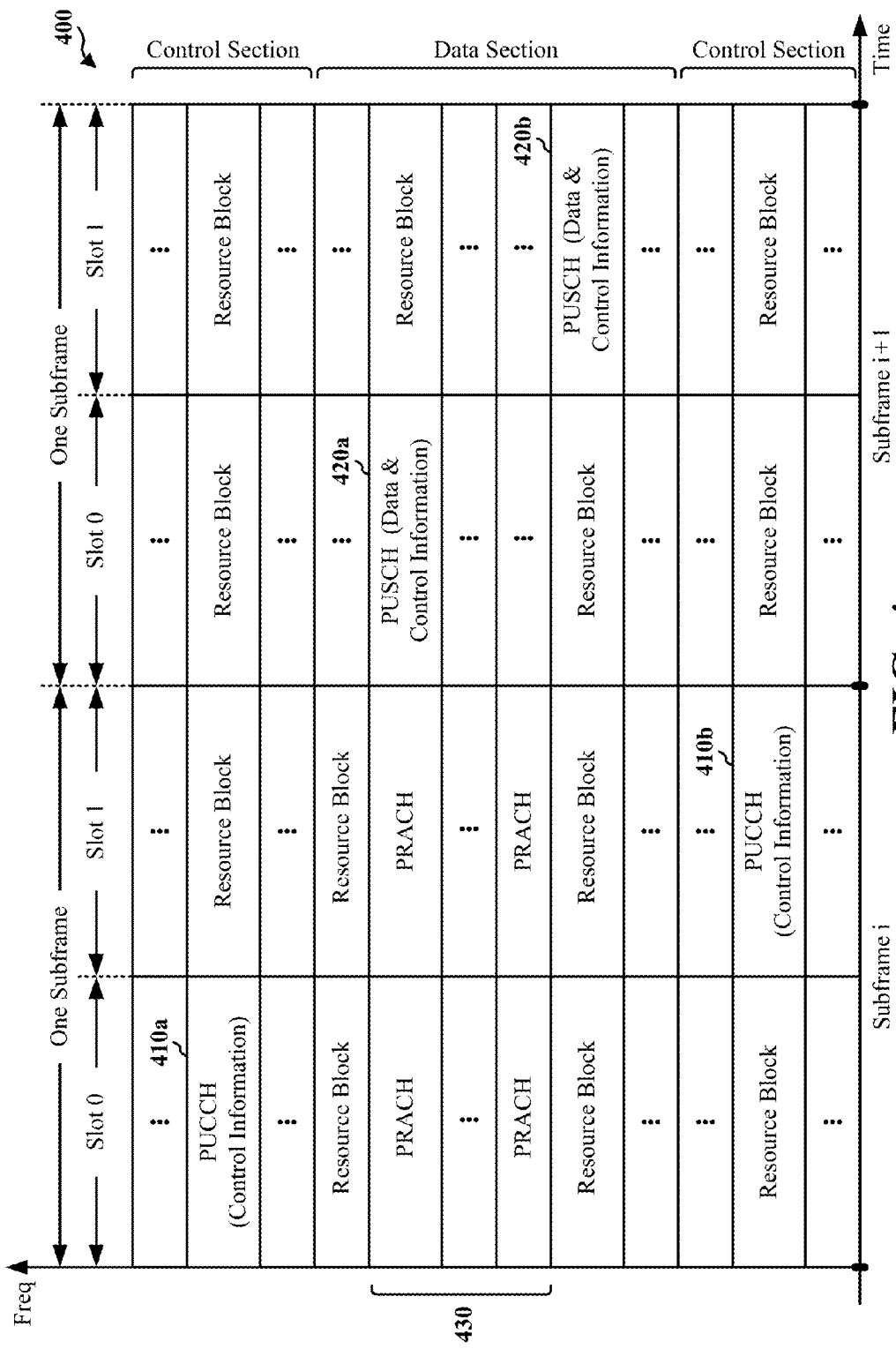
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
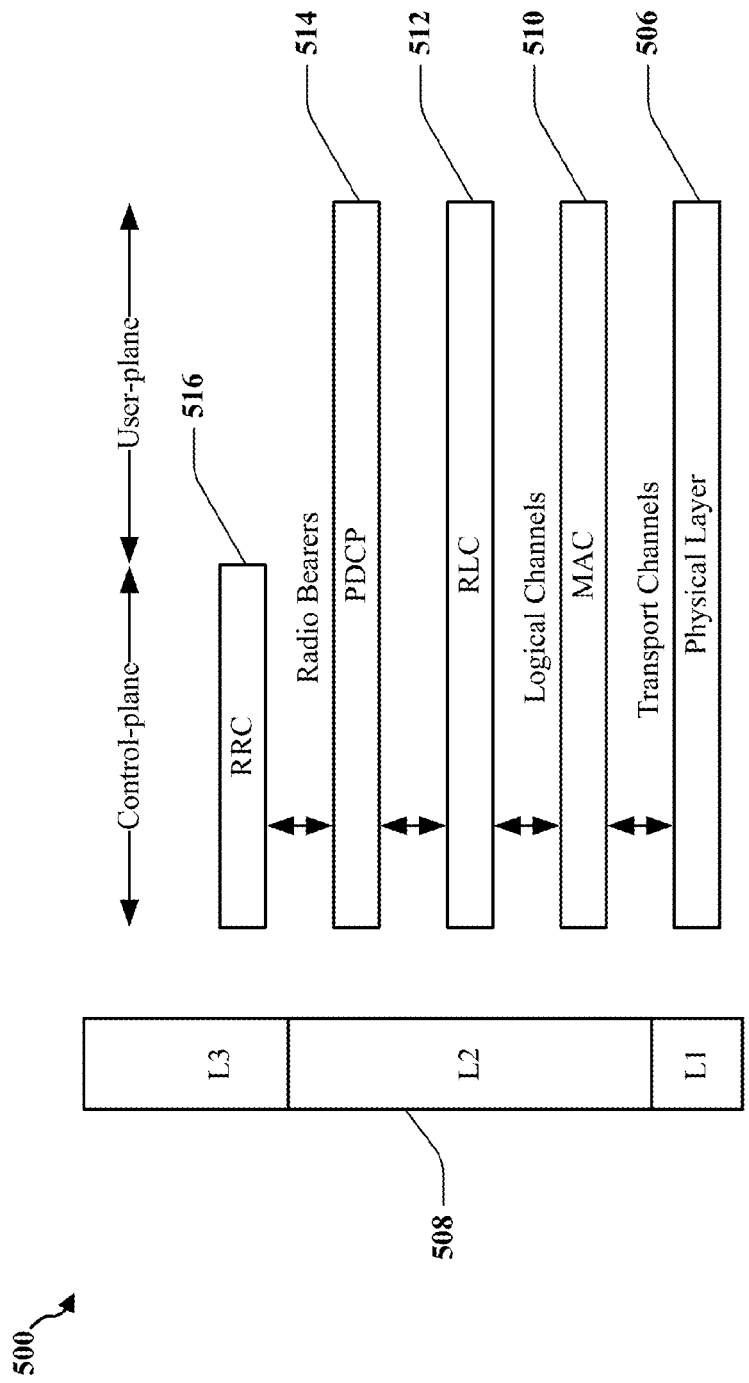
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
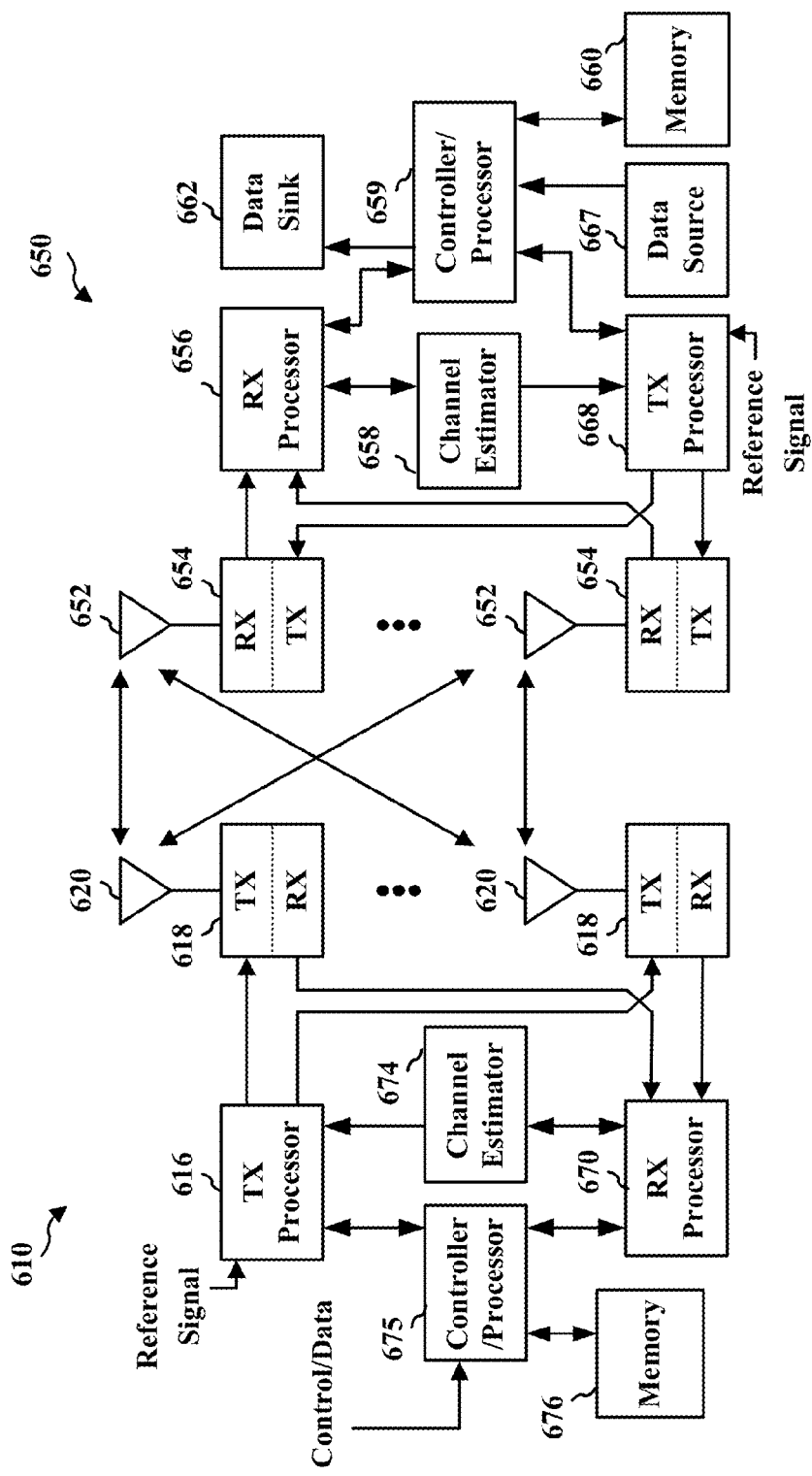
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
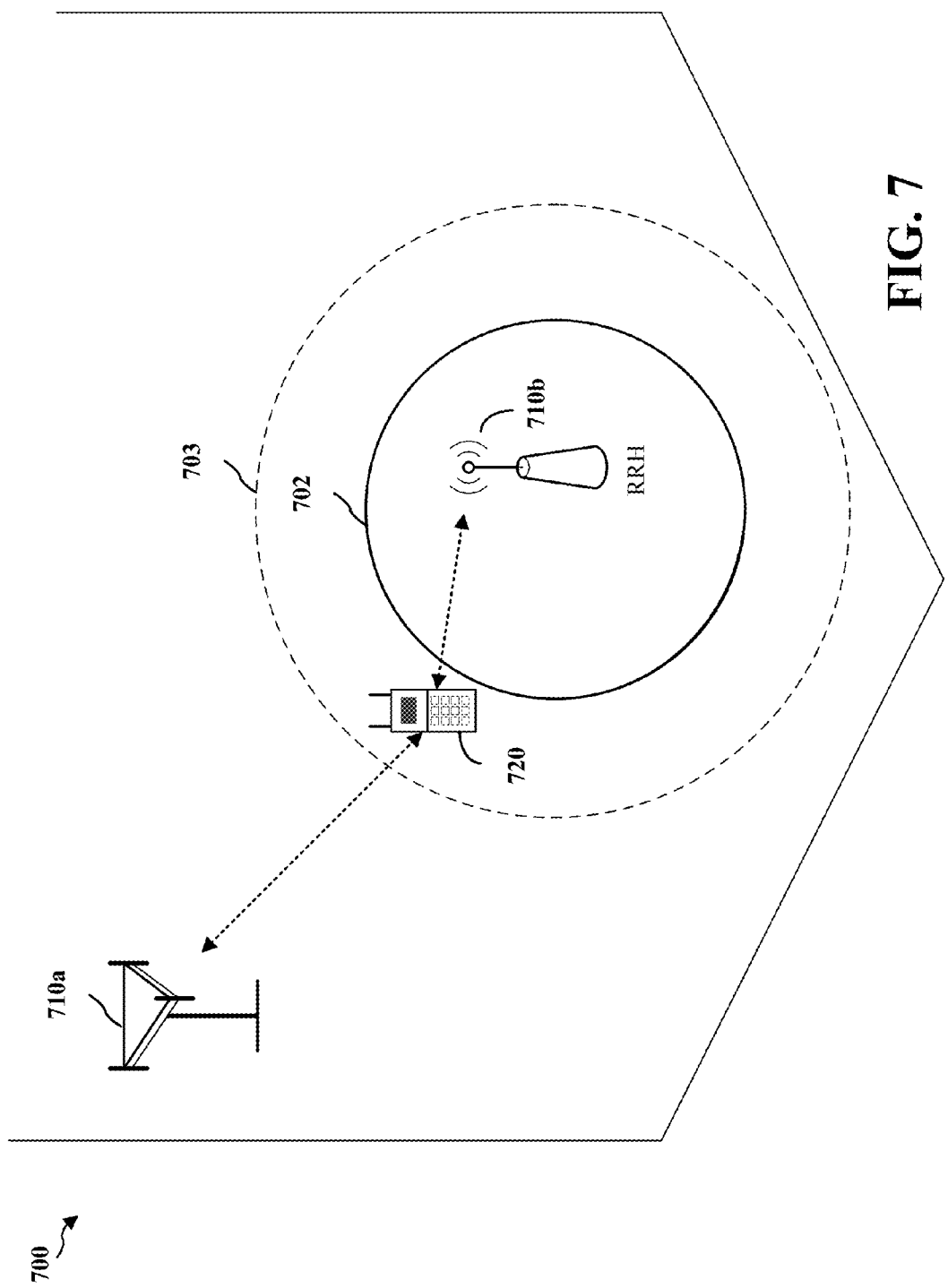
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancellation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8:
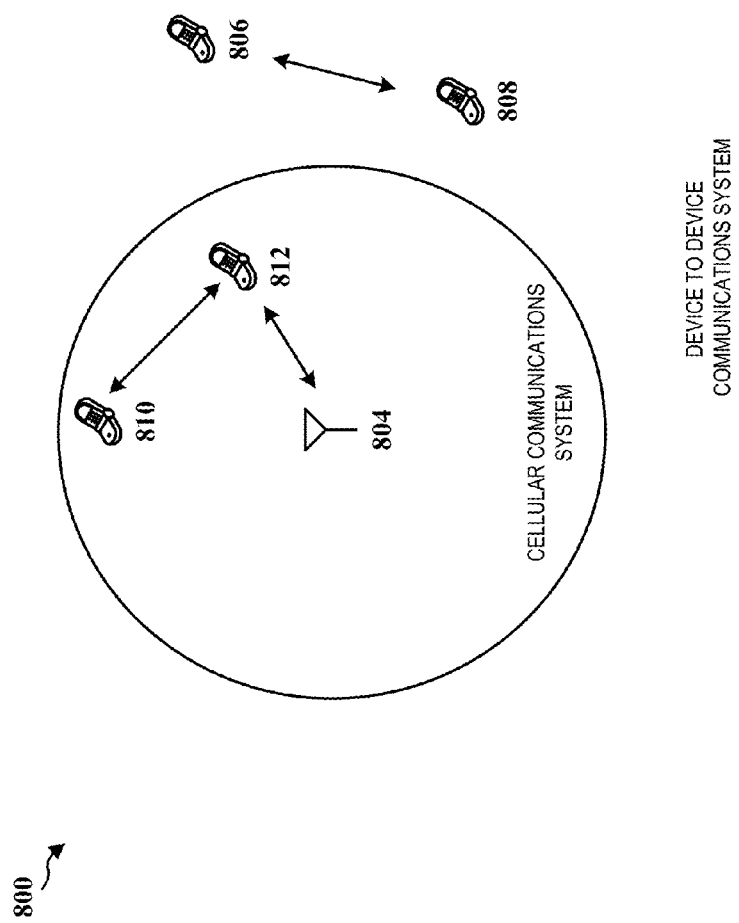
FIG. 8 is a diagram of an exemplary device-to-device (D2D) communications system.

FIG. 8 is a diagram 800 of an exemplary device-to-device (D2D) communications system. The device-to-device communications system 800 includes a plurality of wireless devices 806, 808, 810, 812. The device-to-device communications system 800 may overlap with a cellular communications system, such as for example, a wireless wide area network (WWAN) (e.g., access network 200). Some of the wireless devices 806, 808, 810, 812 may communicate together in device-to-device communication, some may communicate with the base station 804, and some may do both. Device-to-device communication may be effectuated by directly transferring signals between the wireless devices. Thus, the signals need not traverse through an access node (e.g., a base station) or centrally managed network. Device-to-device communication may provide short range, high data rate communication (e.g., within a home or office type setting). As shown in FIG. 8, the wireless devices 806, 808 are in device-to-device communication and the wireless devices 810, 812 are in device-to-device communication. The wireless device 812 is also communicating with the base station 804.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

A D2D communications system may be embedded in a cellular spectrum. Accordingly, a device may be provided that supports both cellular communication and D2D communication. Resources allocated for D2D communication may be orthogonal to cellular communication resources in a time-frequency domain.

In an aspect, the device may be capable of switching between the D2D communications system and the cellular communications system. To avoid interference between the two systems, proper timing design of transmission and reception of D2D communication is provided. In one example, a specific D2D transmission (Tx) and reception (Rx) timing solution, and a determination of a cyclic prefix (CP) length and D2D transmission durations, are provided for when D2D resources are allocated in a guard period of an LTE time division duplex (TDD) system. Moreover, D2D Tx and Rx timing solutions are provided for when the D2D resources are embedded in cellular downlink (DL) resources and cellular uplink (UL) resources, respectively.

In the present disclosure, scenarios are provided where the device uses a cellular downlink signal as a timing reference. A propagation delay from the device to a cellular cell antenna may be unknown. The present disclosure addresses D2D transmission timing, D2D reception timing, D2D transmission duration, and a cyclic prefix (CP) length of a D2D OFDM symbol when D2D communication is conducted on a portion of configured D2D resources embedded in a cellular spectrum.

In an aspect, two particular cases are considered: 1) D2D resources embedded in cellular downlink resources; and 2) D2D resources embedded in cellular uplink resources. Hereinafter, the cellular communications system may be referred to as "technology-1."

Figure 9:
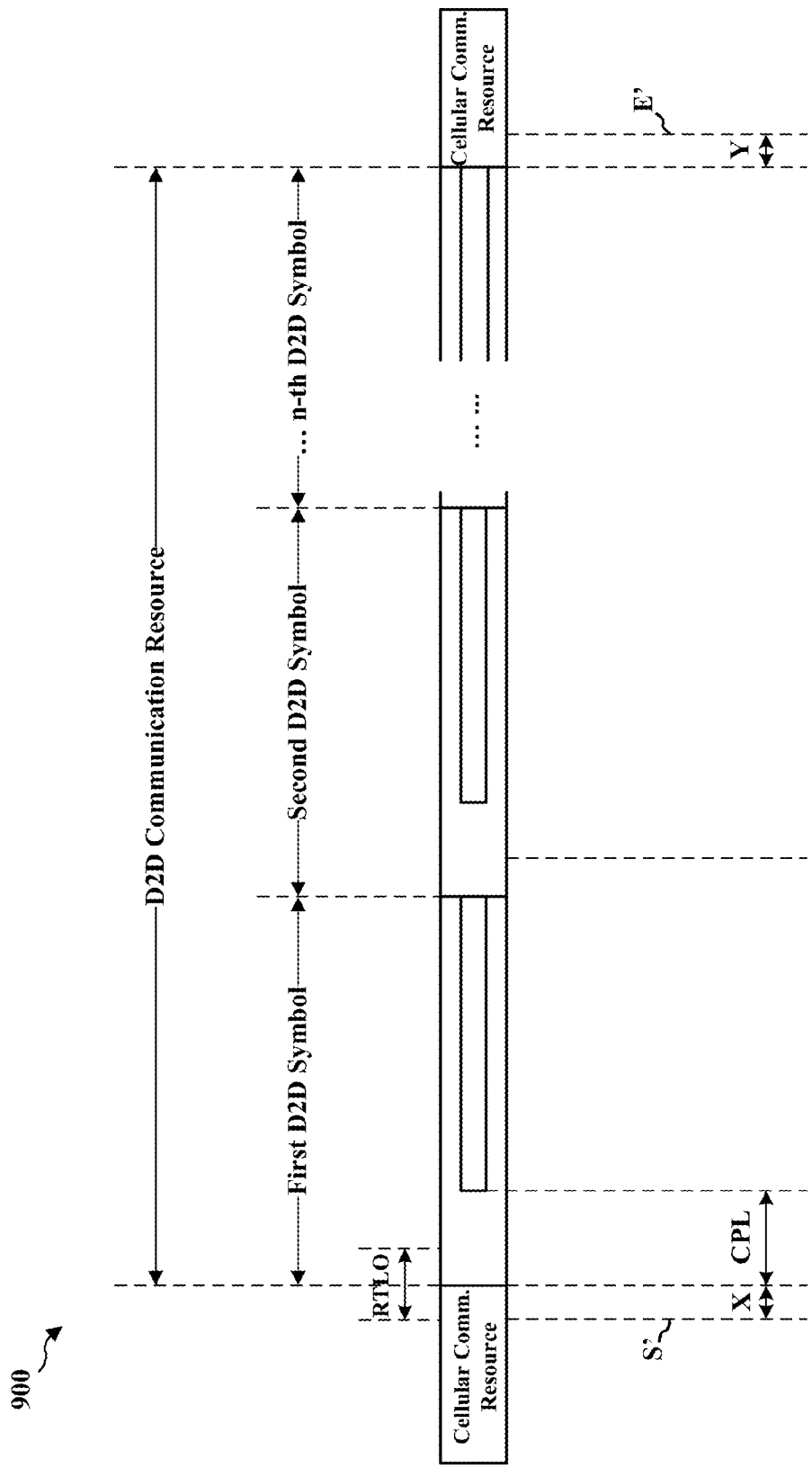
FIG. 9 is a diagram of a device view of a partition between a cellular communications system resource and a D2D resource with cellular communications system downlink timing.

FIG. 9 is a diagram 900 of a device view of a partition between a cellular communications system resource and a D2D resource with cellular communications system downlink timing. The cellular communications system (technology-1) comprises at least one base station (BS) and at least one user equipment (UE). Technology-1 may be deployed in a time-synchronized manner. That is, all base stations are synchronized in time. In downlink, a signal arriving at the UE (i.e., arrived signal) arrives with a propagation delay $t_C$. Therefore, the arrived signal is offset with respect to a BS timing by an amount of time equal to the propagation delay $t_C$. In uplink, to allow each UE signal to arrive at the BS with an aligned timing, the UE technology-1 transmission may be time-advanced by an amount of time equal to $t_C$ with respect to the BS timing. Accordingly, D2D timing may be different depending on whether the D2D resources are embedded in downlink resources of technology-1 or uplink resources of technology-1. The present disclosure provides for both cases.

In an aspect, a system may signal to the UE that there exist time-frequency resources allocated for D2D discovery and/or communication in a spectrum shared with technology-1. A portion of a D2D resource may have a starting time point denoted by S and an ending time point denoted by E observed at the BS. In a resource cycle, resources located prior to the start point S and after the end point E may be allocated for technology-1. Resources located after the start point S and prior to the end point E may be allocated for D2D communication. Therefore, for D2D communication, an allocated resource duration G in the resource cycle may be represented by equation (1) below:

$$G = E - S \quad (1)$$

A UE may identify propagated copies of S and E due to the propagation delay $t_C$. The propagated copies of S and E may be respectively denoted as S' and E' (see FIG. 9) and represented by equations (2) and (3) below:

$$S' = S + t_C \quad (2)$$

$$E' = E + t_C \quad (3)$$

In some cases, the UE may not know the exact value of $t_C$. Nonetheless, the UE may still determine when to transmit and/or receive a D2D signal based on an identification of S' and E'. Hence, knowledge of $t_C$ is unnecessary, and therefore, performance of a RACH procedure may be unnecessary. Consequently, resources may be conserved by eliminating the performance of the RACH procedure.

Referring to FIG. 9, a D2D device may transmit a D2D signal starting at S'+X, wherein X is an offset to the technology-1 downlink timing of the propagated resource start point S', from a first D2D symbol to the end of an n-th D2D symbol within the resources allocated for D2D communication. Each D2D symbol may have a length SL in the time domain. A D2D device may complete the D2D transmission no later than E'−Y, wherein Y is a timing advance of the technology-1 downlink timing of the propagated resource end point E'.

A duration of a main body of a D2D symbol is 1/ss second, where "ss" is a subcarrier spacing in units of hertz (Hz). A cyclic prefix having a length of CPL second may be added before the main body of the D2D symbol. Accordingly, a total duration of the D2D symbol SL may be represented by equation (4) below:

$$SL=1/ss+CPL \quad (4)$$

Still referring to FIG. 9, a D2D device may receive a D2D signal starting at a time S'+RTLO, wherein RTLO is a receiving timeline offset to the technology-1 downlink timing. A received symbol duration for signal processing may be 1/ss second. The receiving process may be applied in a periodic pattern during the allocated D2D resource, wherein the period is equal to the D2D symbol length SL=1/ss+CPL. A receiving timeline R(i) for an i-th D2D symbol may be provided by equation (5) below, where i is the i-th D2D symbol transmitted in the portion of the D2D resource:

$$R(i)=S'+RTLO+((i-1)*SL) \quad (5)$$

The UE may be preconfigured with the parameters X, Y, RTLO, and CPL described above. Alternatively, the UE may be configured with the parameters X, Y, RTLO, and CPL via signaling from an infrastructure system of either technology-1 or other communications system. The UE may also be signaled the parameters $T_C$ and $T_D$. $T_C$ corresponds to a maximum expected propagation delay of the technology-1 BS to the UE. $T_D$ corresponds to a maximum expected propagation delay between D2D devices.

In an aspect, $X=\Delta_1+X'$ and $Y=Y'+\Delta_2$, where $\Delta_1$ and $\Delta_2$ relate to an on/off transient time for the device transitioning from a receiving operation to a transmitting operation, or a transmitting operation to a receiving operation, if both $\Delta_1$ and $\Delta_2$ were not taken into account in the definition of S and E.

Accordingly, the values of X', Y', RTLO, and CPL may be derived by linear combinations of $T_C$ and $T_D$ at the UE. For example:

$$X'=a_1*T_C+b_1*T_D;$$

$$Y'=a_2*T_C+b_2*T_D;$$

$$RTLO=X+a_3*T_C+b_4*T_D; \text{ and}$$

$$CPL=a_5*T_C+b_5*T_D.$$

The coefficients $a_i$ are related to a deployment topology of the technology-1 system. In a heterogeneous network deployment of technology-1, the following holds:

T1: If the portion of the D2D resource is embedded in technology-1's downlink resources, then:
X=Max(delta1, $T_C$), wherein delta1 is a transient time for switching from technology-1 downlink reception to D2D transmission;
Y=Max(delta2, $T_C+T_D$), wherein delta2 is a transient time for switching from D2D transmission to technology-1 downlink reception;
RTLO=X+$T_C$+$T_D$;
CPL=2*$T_C$+$T_D$; and
n=⌊(G−X−Y)/SL⌋, wherein n is a number of D2D symbols transmitted in the portion of the D2D resource.

T2: If the portion of the D2D resource is embedded in technology-1's uplink resources, then:
X=delta3, wherein delta3 is a transient time for switching from technology-1 uplink transmission to D2D reception;
Y=delta4+$T_D$+2*$T_C$, wherein delta4 is a transient time for switching from D2D reception to technology-1 uplink transmission;
RTLO=X+$T_C$+$T_D$;
CPL=2*$T_C$+$T_D$; and
n=⌊(G−X−Y)/SL⌋, wherein n is a number of D2D symbols transmitted in the portion of the D2D resource.

For homogeneous deployment of technology-1, some further optimization may be tailored for the homogeneous deployment. Optimization for homogeneous deployment is approximated by:

M1: If the portion of the D2D resource is embedded in technology-1's downlink resources, then:
X=Max(delta1, $(2-\sqrt{3})*T_C$), wherein delta1 is a transient time for switching from technology-1 downlink reception to D2D transmission;
Y=Max(delta2, $(2-\sqrt{3})*T_C+2*T_D$), wherein delta2 is a transient time for switching from D2D transmission to technology-1 downlink reception;
RTLO=X+$(2-\sqrt{3})*T_C+2*T_D$;
CPL=2*$(2-\sqrt{3})*T_C+2*T_D$; and
n=⌊(G−X−Y)/SL⌋, wherein n is a number of D2D symbols transmitted in the portion of the D2D resource.

M2: If the portion of the D2D resource is embedded in technology-1's uplink resources, then:
X=delta3, wherein delta3 is a transient time for switching from technology-1 uplink transmission to D2D reception;
Y=delta4+$T_D$+2*$T_C$, wherein delta4 is a transient time for switching from D2D reception to technology-1 uplink transmission;
RTLO=X+$(2-\sqrt{3})*T_C+2*T_D$;
CPL=2*$(2-\sqrt{3})*T_C+2*T_D$; and
n=⌊(G−X−Y)/SL⌋, wherein n is a number of D2D symbols transmitted in the portion of the D2D resource.

To share the implementation from technology-1, and in the case that technology-1 is an LTE system, the CP length (CPL) can be determined by the following process:

```
if CPL ≤ normal CP length
    then D2D communications adopt normal CP length
else if CPL ≤ extended CP length
    then D2D communications adopt extended CP length
else assume half sub-currier space for double the symbol/CP duration.
```

As mentioned above, a number of D2D symbols n transmitted in the portion of the D2D resource may be represented by equation (6) below:

$$n=\lfloor(G-X-Y)/SL\rfloor \quad (6)$$

A D2D transmission duration L in the allocated portion of the D2D resource may be represented by equation (7) below:

$$L=n*SL \quad (7)$$

Figure 10:
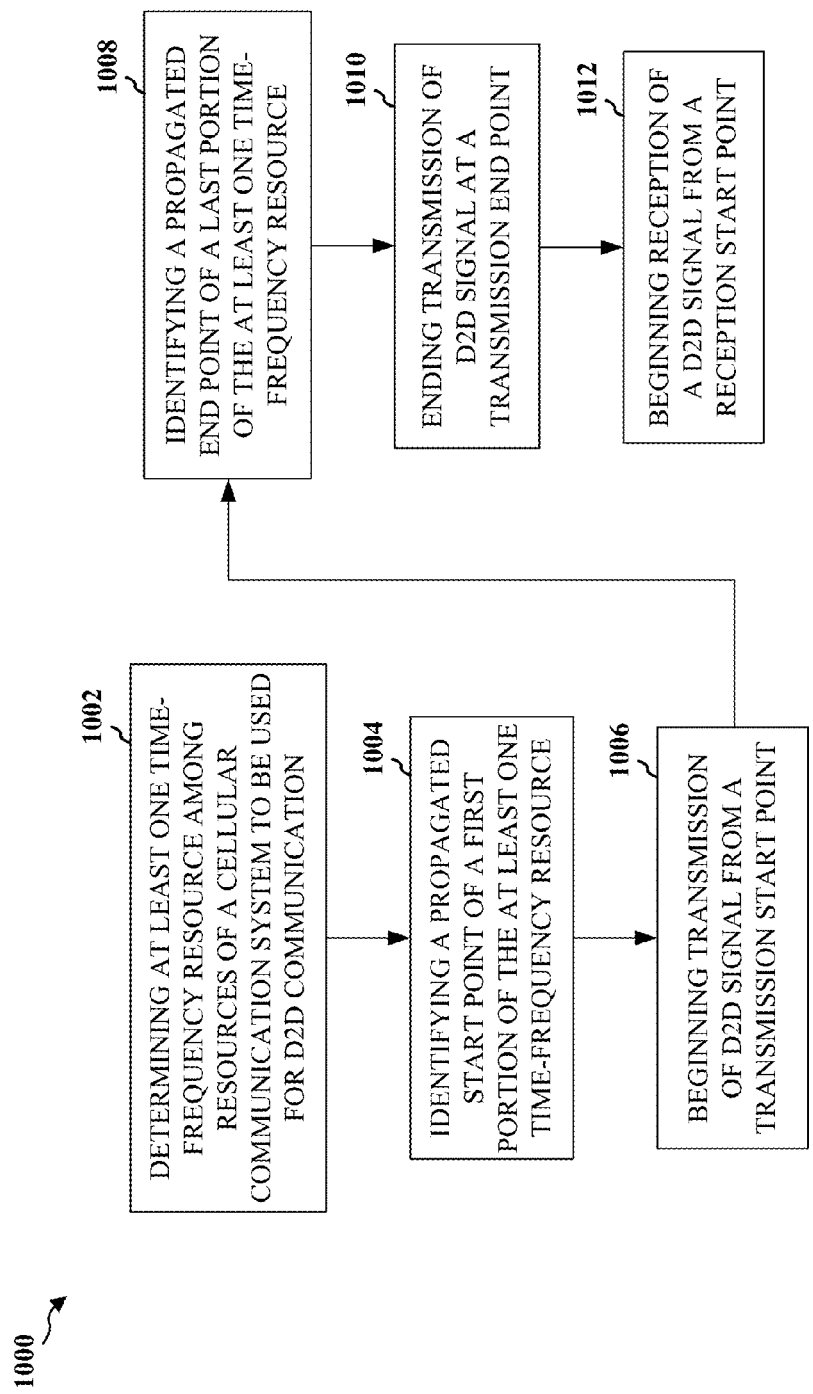
FIG. 10 is a flow chart of a method of wireless communication.

FIG. 10 is a flow chart 1000 of a method of wireless communication. The method may be performed by a UE. At step 1002, the UE determines at least one time-frequency resource among resources of a cellular communication system to be used for D2D communication. At step 1004, the UE identifies a propagated start point (e.g., S') of a first portion of the at least one time-frequency resource. The propagated start point may be based on a network start point (e.g., S) of the first portion and a propagation delay (e.g., $t_C$). Also, the propagated start point may be considered as a start point of the first portion as observed by the UE.

At step 1006, the UE begins transmission of a device-to-device (D2D) signal from a transmission start point. The transmission start point may be based on the propagated start point and a cellular communication system downlink timing offset (e.g., X) to the propagated start point.

At step 1008, the UE identifies a propagated end point (e.g., E') of a last portion of the at least one time-frequency resource. The propagated end point may be a delayed version of a network end point (e.g., E) of the last portion due to the propagation delay (e.g., $t_C$). Also, the propagated end point may be considered as an end point of the last portion as observed by the UE.

At step 1010, the UE ends transmission of the D2D signal at a transmission end point. The transmission end point may be based on the propagated end point and a cellular communication system downlink timing advance (e.g., Y) to the propagated end point. At step 1012, the UE begins reception of a D2D signal from a reception start point. The reception start point may be based on the propagated start point (e.g., S') and a cellular communication system downlink timing receiving timeline offset (RTLO).

A length of a portion of the at least one time-frequency resource is equal to a sum of a cyclic prefix length (CPL) of a respective resource and an inverse of a subcarrier spacing (e.g., ss) of the resources of the cellular communication system. Moreover, the at least one time-frequency resource determined to be used for D2D communication is embedded among downlink resources of the cellular communication system and/or uplink resources of the cellular communication system.

In an aspect, a number of D2D symbols n transmitted on the at least one time-frequency resource to be used for D2D communication is provided by $n=\lfloor(G-X-Y)/SL\rfloor$, wherein G is a difference between an allocated D2D resource end point and an allocated D2D resource start point, X is the downlink timing offset, Y is the downlink timing advance, and SL is a symbol length. Accordingly, a D2D transmission duration L on the at least one time-frequency resource to be used for D2D communication may be provided by $L=n*SL$.

In an aspect, the downlink timing offset is provided by $X=\max(\text{delta1}, T_C)$ when the cellular communication system is deployed as a heterogeneous network and the at least one time-frequency resource to be used for D2D communication is embedded in downlink resources of the cellular communication system, wherein X is the downlink timing offset, delta1 is a transient time for switching from downlink reception resources of the cellular communication system to the at least one time-frequency resource to be used for D2D transmission, and $T_C$ is a maximum expected propagation delay of the cellular communication system.

In an aspect, the downlink timing offset is provided by X=delta3 when the cellular communication system is deployed as a heterogeneous network and the at least one time-frequency resource to be used for D2D communication is embedded in uplink resources of the cellular communication system, wherein X is the downlink timing offset and delta3 is a transient time for switching from uplink transmission resources of the cellular communication system to the at least one time-frequency resource to be used for D2D reception.

In an aspect, the downlink timing offset is provided by $X=\max(\text{delta1}, (2-\sqrt{3})*T_C)$ when the cellular communication system is deployed as a homogeneous network and the at least one time-frequency resource to be used for D2D communication is embedded in downlink resources of the cellular communication system, wherein X is the downlink timing offset, delta1 is a transient time for switching from downlink reception resources of the cellular communication system to the at least one time-frequency resource to be used for D2D transmission, and $T_C$ is a maximum expected propagation delay of the cellular communication system.

In an aspect, the downlink timing offset is provided by X=delta3 when the cellular communication system is deployed as a homogeneous network and the at least one time-frequency resource to be used for D2D communication is embedded in uplink resources of the cellular communication system, wherein X is the downlink timing offset and delta3 is a transient time for switching from uplink transmission resources of the cellular communication system to the at least one time-frequency resource to be used for D2D reception.

In an aspect, the downlink timing advance is provided by $Y=\max(\text{delta2}, T_C+T_D)$ when the cellular communication system is deployed as a heterogeneous network and the at least one time-frequency resource to be used for D2D communication is embedded in downlink resources of the cellular communication system, wherein Y is the downlink timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

In an aspect, the downlink timing advance is provided by $Y=\text{delta4}+T_D+2*T_C$ when the cellular communication system is deployed as a heterogeneous network and the at least one time-frequency resource to be used for D2D communication is embedded in uplink resources of the cellular communication system, wherein Y is the downlink timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

In an aspect, the downlink timing advance is provided by $Y=\max(\text{delta2}, (2-\sqrt{3})*T_C+2*T_D)$ when the cellular communication system is deployed as a homogeneous network and the at least one time-frequency resource to be used for D2D communication is embedded in downlink resources of the cellular communication system, wherein Y is the downlink timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

In an aspect, the downlink timing advance is provided by $Y=\text{delta4}+T_D+2*T_C$ when the cellular communication system is deployed as a homogeneous network and the at least one time-frequency resource to be used for D2D communication is embedded in uplink resources of the cellular communication system, wherein Y is the downlink timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

In an aspect, the RTLO is provided by RTLO=$X+T_C+T_D$ when the cellular communication system is deployed as a heterogeneous network and the at least one time-frequency resource to be used for D2D communication is embedded in downlink resources of the cellular communication system, wherein X is the downlink timing offset, $T_C$ is a maximum expected propagation delay of the cellular communication system, and $T_D$ is a maximum expected propagation delay between D2D devices.

In an aspect, the RTLO is provided by RTLO=$X+T_C+T_D$ when the cellular communication system is deployed as a heterogeneous network and the at least one time-frequency resource to be used for D2D communication is embedded in uplink resources of the cellular communication system, wherein X is the downlink timing offset, $T_C$ is a maximum expected propagation delay of the cellular communication system, and $T_D$ is a maximum expected propagation delay between D2D devices.

In an aspect, the RTLO is provided by RTLO=$X+(2-\sqrt{3})*T_C+2*T_D$ when the cellular communication system is deployed as a homogeneous network and the at least one time-frequency resource to be used for D2D communication is embedded in downlink resources of the cellular communication system, wherein X is the downlink timing offset, $T_C$ is a maximum expected propagation delay of the cellular communication system, and $T_D$ is a maximum expected propagation delay between D2D devices.

In an aspect, the RTLO is provided by RTLO=$X+(2-\sqrt{3})*T_C+2*T_D$ when the cellular communication system is deployed as a homogeneous network and the at least one time-frequency resource to be used for D2D communication is embedded in uplink resources of the cellular communication system, wherein X is the downlink timing offset, $T_C$ is a maximum expected propagation delay of the cellular communication system, and $T_D$ is a maximum expected propagation delay between D2D devices.

In an aspect, the CPL is provided by CPL=$2*T_C+T_D$ when the cellular communication system is deployed as a heterogeneous network and the at least one time-frequency resource to be used for D2D communication is embedded in downlink resources of the cellular communication system, wherein $T_C$ is a maximum expected propagation delay of the cellular communication system and $T_D$ is a maximum expected propagation delay between D2D devices.

In an aspect, the CPL is provided by CPL=$2*T_C+T_D$ when the cellular communication system is deployed as a heterogeneous network and the at least one time-frequency resource to be used for D2D communication is embedded in uplink resources of the cellular communication system, wherein $T_C$ is a maximum expected propagation delay of the cellular communication system and $T_D$ is a maximum expected propagation delay between D2D devices.

In an aspect, the CPL is provided by CPL=$2*(2-\sqrt{3})*T_C+2*T_D$ when the cellular communication system is deployed as a homogeneous network and the at least one time-frequency resource to be used for D2D communication is embedded in downlink resources of the cellular communication system, wherein $T_C$ is a maximum expected propagation delay of the cellular communication system and $T_D$ is a maximum expected propagation delay between D2D devices.

In an aspect, the CPL is provided by CPL=$2*(2-\sqrt{3})*T_C+2*T_D$ when the cellular communication system is deployed as a homogeneous network and the at least one time-frequency resource to be used for D2D communication is embedded in uplink resources of the cellular communication system, wherein $T_C$ is a maximum expected propagation delay of the cellular communication system and $T_D$ is a maximum expected propagation delay between D2D devices.

Figure 11:
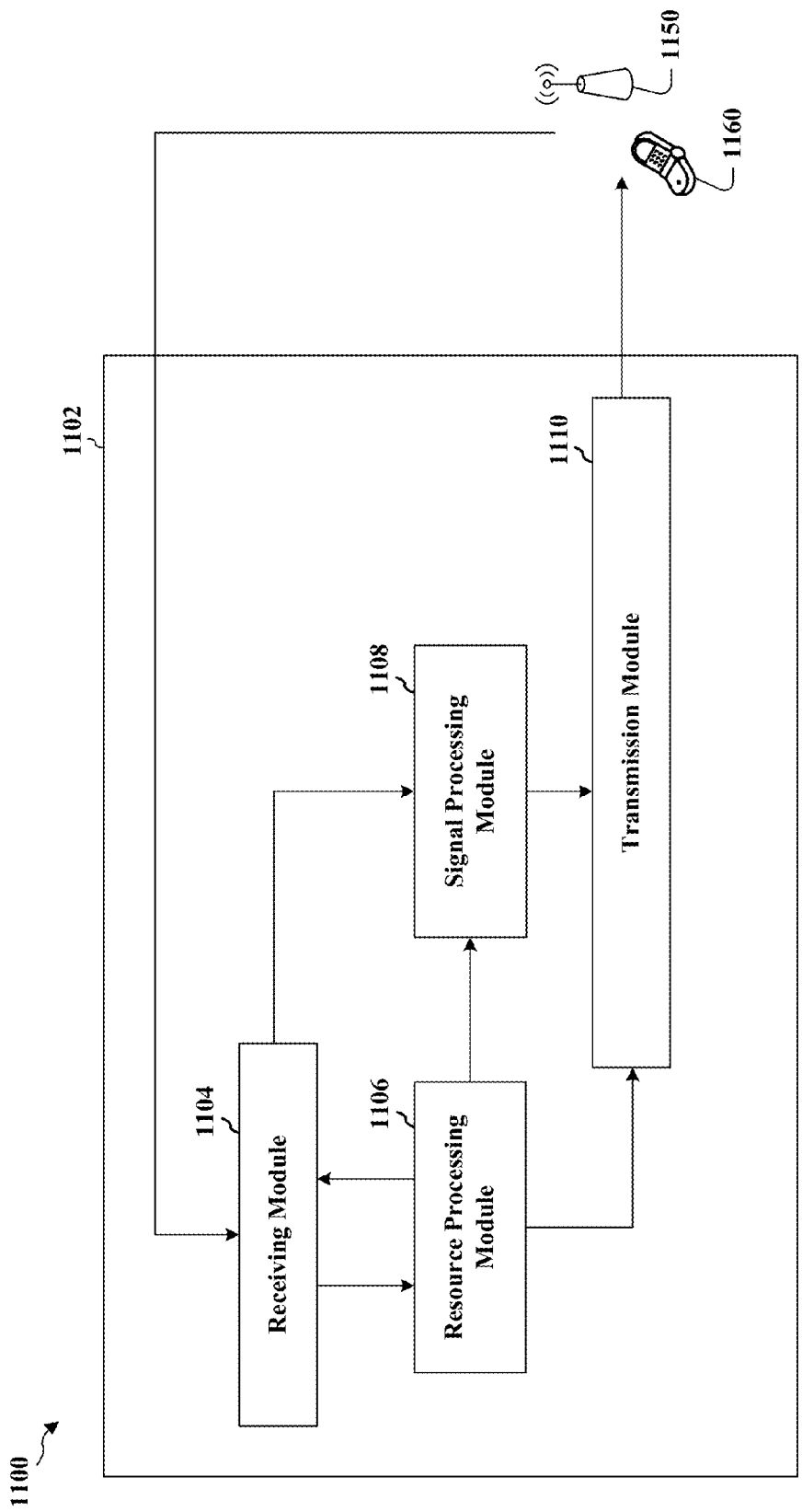
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a receiving module 1104, a resource processing module 1106, a signal processing module 1108, and a transmission module 1110.

The resource processing module 1106 determines at least one time-frequency resource among resources of a cellular communication system to be used for D2D communication. The resource processing module 1106 further identifies a propagated start point (e.g., S') of a first portion of the at least one time-frequency resource. The propagated start point may be based on a network (or base station 1150) start point (e.g., S) of the first portion and a propagation delay (e.g., $t_C$). Also, the propagated start point may be considered as a start point of the first portion as observed by the apparatus.

The signal processing module 1108 begins transmission (via the transmission module 1110) of a device-to-device (D2D) signal to a device (e.g., UE 1160) from a transmission start point. The transmission start point may be based on the propagated start point identified by the resource processing module 1106 and a cellular communication system downlink timing offset (e.g., X) to the propagated start point.

The resource processing module 1106 also identifies a propagated end point (e.g., E') of a last portion of the at least one time-frequency resource. The propagated end point may be a delayed version of a network (or base station 1150) end point (e.g., E) of the last portion due to the propagation delay (e.g., $t_C$). Also, the propagated end point may be considered as an end point of the last portion as observed by the apparatus.

The signal processing module 1108 ends transmission (via the transmission module 1110) of the D2D signal to the device (e.g., UE 1160) at a transmission end point. The transmission end point may be based on the propagated end point identified by the resource processing module 1106 and a cellular communication system downlink timing advance (e.g., Y) to the propagated end point. The signal processing module 1108 may also begin reception (via the receiving module 1104) of a D2D signal from the device (e.g., UE 1160) at a reception start point. The reception start point may be based on the propagated start point (e.g., S') identified by the resource processing module 1106 and a cellular communication system downlink timing receiving timeline offset (RTLO).

A length of a portion of the at least one time-frequency resource is equal to a sum of a cyclic prefix length (CPL) of a respective resource and an inverse of a subcarrier spacing (e.g., ss) of the resources of the cellular communication system. Moreover, the at least one time-frequency resource determined to be used for D2D communication is embedded among downlink resources of the cellular communication system and/or uplink resources of the cellular communication system.

In an aspect, a number of D2D symbols n transmitted on the at least one time-frequency resource to be used for D2D communication is provided by n=$\lfloor (G-X-Y)/SL \rfloor$, wherein G is a difference between an allocated D2D resource end point and an allocated D2D resource start point, X is the downlink timing offset, Y is the downlink timing advance, and SL is a symbol length. Accordingly, a D2D transmission duration L on the at least one time-frequency resource to be used for D2D communication may be provided by L=n*SL.

In an aspect, the downlink timing offset is provided by X=max(delta1, $T_C$) when the cellular communication system is deployed as a heterogeneous network and the at least one time-frequency resource to be used for D2D communication is embedded in downlink resources of the cellular communication system, wherein X is the downlink timing offset, delta1 is a transient time for switching from downlink reception resources of the cellular communication system to the at least one time-frequency resource to be used for D2D transmission, and $T_C$ is a maximum expected propagation delay of the cellular communication system.

In an aspect, the downlink timing offset is provided by X=delta3 when the cellular communication system is deployed as a heterogeneous network and the at least one time-frequency resource to be used for D2D communication is embedded in uplink resources of the cellular communication system, wherein X is the downlink timing offset and delta3 is a transient time for switching from uplink transmission resources of the cellular communication system to the at least one time-frequency resource to be used for D2D reception.

In an aspect, the downlink timing offset is provided by X=max(delta1, (2−√3)*$T_C$) when the cellular communication system is deployed as a homogeneous network and the at least one time-frequency resource to be used for D2D communication is embedded in downlink resources of the cellular communication system, wherein X is the downlink timing offset, delta1 is a transient time for switching from downlink reception resources of the cellular communication system to the at least one time-frequency resource to be used for D2D transmission, and $T_C$ is a maximum expected propagation delay of the cellular communication system.

In an aspect, the downlink timing offset is provided by X=delta3 when the cellular communication system is deployed as a homogeneous network and the at least one time-frequency resource to be used for D2D communication is embedded in uplink resources of the cellular communication system, wherein X is the downlink timing offset and delta3 is a transient time for switching from uplink transmission resources of the cellular communication system to the at least one time-frequency resource to be used for D2D reception.

In an aspect, the downlink timing advance is provided by Y=max(delta2, $T_C$+$T_D$) when the cellular communication system is deployed as a heterogeneous network and the at least one time-frequency resource to be used for D2D communication is embedded in downlink resources of the cellular communication system, wherein Y is the downlink timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

In an aspect, the downlink timing advance is provided by Y=delta4+$T_D$+2*$T_C$ when the cellular communication system is deployed as a heterogeneous network and the at least one time-frequency resource to be used for D2D communication is embedded in uplink resources of the cellular communication system, wherein Y is the downlink timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

In an aspect, the downlink timing advance is provided by Y=max(delta2, (2−√3)*$T_C$+2*$T_D$) when the cellular communication system is deployed as a homogeneous network and the at least one time-frequency resource to be used for D2D communication is embedded in downlink resources of the cellular communication system, wherein Y is the downlink timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

In an aspect, the downlink timing advance is provided by Y=delta4+$T_D$+2*$T_C$ when the cellular communication system is deployed as a homogeneous network and the at least one time-frequency resource to be used for D2D communication is embedded in uplink resources of the cellular communication system, wherein Y is the downlink timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

In an aspect, the RTLO is provided by RTLO=X+$T_C$+$T_D$ when the cellular communication system is deployed as a heterogeneous network and the at least one time-frequency resource to be used for D2D communication is embedded in downlink resources of the cellular communication system, wherein X is the downlink timing offset, $T_C$ is a maximum expected propagation delay of the cellular communication system, and $T_D$ is a maximum expected propagation delay between D2D devices.

In an aspect, the RTLO is provided by RTLO=X+$T_C$+$T_D$ when the cellular communication system is deployed as a heterogeneous network and the at least one time-frequency resource to be used for D2D communication is embedded in uplink resources of the cellular communication system, wherein X is the downlink timing offset, $T_C$ is a maximum expected propagation delay of the cellular communication system, and $T_D$ is a maximum expected propagation delay between D2D devices.

In an aspect, the RTLO is provided by RTLO=X+(2−√3)*$T_C$+2*$T_D$ when the cellular communication system is deployed as a homogeneous network and the at least one time-frequency resource to be used for D2D communication is embedded in downlink resources of the cellular communication system, wherein X is the downlink timing offset, $T_C$ is a maximum expected propagation delay of the cellular communication system, and $T_D$ is a maximum expected propagation delay between D2D devices.

In an aspect, the RTLO is provided by RTLO=X+(2−√3)*$T_C$+2*$T_D$ when the cellular communication system is deployed as a homogeneous network and the at least one time-frequency resource to be used for D2D communication is embedded in uplink resources of the cellular communication system, wherein X is the downlink timing offset, $T_C$ is a maximum expected propagation delay of the cellular communication system, and $T_D$ is a maximum expected propagation delay between D2D devices.

In an aspect, the CPL is provided by CPL=2*$T_C$+$T_D$ when the cellular communication system is deployed as a heterogeneous network and the at least one time-frequency resource to be used for D2D communication is embedded in downlink resources of the cellular communication system, wherein $T_C$ is a maximum expected propagation delay of the cellular communication system and $T_D$ is a maximum expected propagation delay between D2D devices.

In an aspect, the CPL is provided by CPL=2*$T_C$+$T_D$ when the cellular communication system is deployed as a heterogeneous network and the at least one time-frequency resource to be used for D2D communication is embedded in uplink resources of the cellular communication system, wherein $T_C$ is a maximum expected propagation delay of the cellular communication system and $T_D$ is a maximum expected propagation delay between D2D devices.

In an aspect, the CPL is provided by CPL=2*(2−√3)*$T_C$+2*$T_D$ when the cellular communication system is deployed as a homogeneous network and the at least one time-frequency resource to be used for D2D communication is embedded in downlink resources of the cellular communication system, wherein $T_C$ is a maximum expected propagation delay of the cellular communication system and $T_D$ is a maximum expected propagation delay between D2D devices.

In an aspect, the CPL is provided by CPL=2*(2−√3)*$T_C$+2*$T_D$ when the cellular communication system is deployed as a homogeneous network and the at least one time-frequency resource to be used for D2D communication is embedded in uplink resources of the cellular communication system, wherein $T_C$ is a maximum expected propagation delay of the cellular communication system and $T_D$ is a maximum expected propagation delay between D2D devices.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
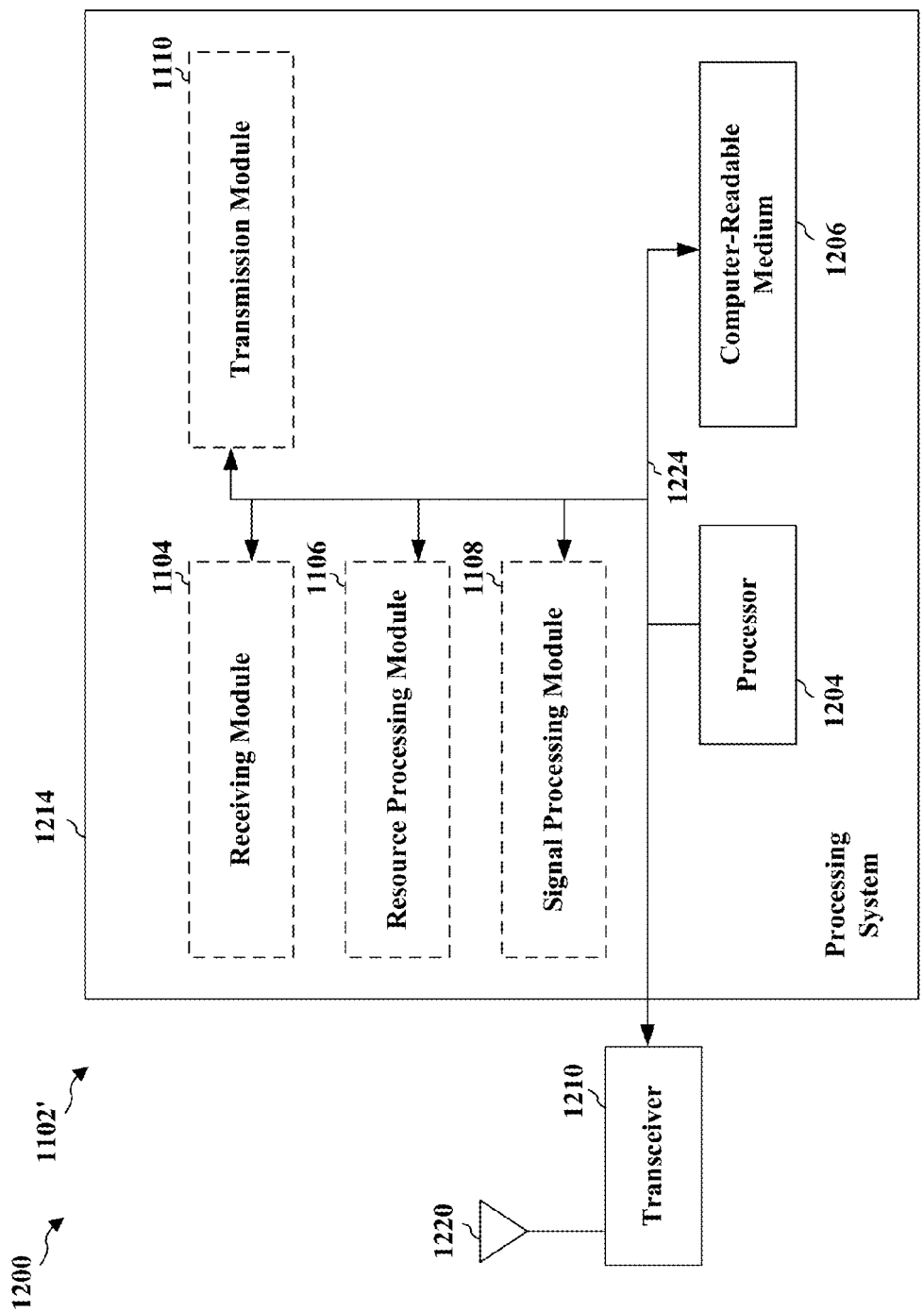
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1110, and based on the received information, generates a signal to be applied to the one or more antennas 1220. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, and 1110. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for identifying a propagated start point of a first portion of at least one time-frequency resource, means for beginning transmission of a device-to-device (D2D) signal from a transmission start point, the transmission start point based on the propagated start point and a cellular communication system downlink timing offset to the propagated start point, means for determining the at least one time-frequency resource among resources of a cellular communication system to be used for D2D communication, means for identifying a propagated end point of a last portion of the at least one time-frequency resource, means for ending transmission of the D2D signal at a transmission end point, the transmission end point based on the propagated end point and a cellular communication system downlink timing advance to the propagated end point, and means for beginning reception of a D2D signal from a reception start point, the reception start point based on the propagated start point and a cellular communication system downlink timing receiving timeline offset (RTLO).

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication in a cellular communication system, comprising:
   identifying, by a user equipment (UE), a propagated start point of a first portion of at least one time-frequency resource, wherein the propagated start point is based on a network start point of the first portion and one of a propagation delay or a propagation advance between the UE and a base station; and
   transmitting, by the UE, a device-to-device (D2D) signal beginning from a transmission start point and ending at a transmission end point, the transmission start point being based on the propagated start point and addition of a timing offset to the propagated start point, the timing offset being based on a propagation delay between the UE and the base station when the at least one time-frequency resource is embedded in downlink resources of the base station, the transmission end point being based on subtraction of a timing advance from a propagated end point, the timing advance based on a propagation delay between the UE and a second UE, the addition of the timing offset causing the transmission of the D2D signal to start after the propagated start point and the subtraction of the timing advance causing the transmission of the D2D signal to end before the propagated end point, wherein a number of D2D symbols n transmitted on the at least one time-frequency resource to be used for D2D communication is provided by the following equation:

$$n = \lfloor (G-X-Y)/SL \rfloor,$$

wherein G is a difference between an allocated D2D resource end point and an allocated D2D resource start point, X is the timing offset, Y is a D2D timing advance, and SL is a symbol length.

2. The method of claim 1, further comprising determining the at least one time-frequency resource among resources of a cellular communication system to be used for D2D communication.

3. The method of claim 1, wherein the propagated start point is a UE start point of the first portion.

4. The method of claim 1, further comprising:
   identifying the propagated end point of a last portion of the at least one time-frequency resource; and
   ending transmission of the D2D signal at a transmission end point, the transmission end point based on the propagated end point and the D2D timing advance to the propagated end point.

5. The method of claim 4, wherein the propagated end point is a delayed version of a network end point of the last portion due to a propagation delay.

6. The method of claim 4, wherein the propagated end point is a UE end point of the last portion.

7. The method of claim 4, wherein:
   the D2D timing advance is provided by the following equation when the cellular communication system is deployed as a heterogeneous network and the at least one time-frequency resource to be used for D2D communication is embedded in downlink resources of the cellular communication system:

$$Y = \max(\text{delta2}, T_C + T_D),$$

wherein Y is the D2D timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

8. The method of claim 4, wherein:
   the D2D timing advance is provided by the following equation when the cellular communication system is deployed as a heterogeneous network and the at least one time-frequency resource to be used for D2D communication is embedded in uplink resources of the cellular communication system:

$$Y = \text{delta4} + T_D + 2*T_C,$$

wherein Y is the D2D timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

9. The method of claim 4, wherein:
   the D2D timing advance is provided by the following equation when the cellular communication system is deployed as a homogeneous network and the at least one time-frequency resource to be used for D2D communication is embedded in downlink resources of the cellular communication system:

$$Y = \max(\text{delta2}, (2-\sqrt{3})*T_C + 2*T_D),$$

wherein Y is the D2D timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

10. The method of claim 4, wherein:
    the D2D timing advance is provided by the following equation when the cellular communication system is deployed as a homogeneous network and the at least one time-frequency resource to be used for D2D communication is embedded in uplink resources of the cellular communication system:

$$Y = \text{delta4} + T_D + 2*T_C,$$

wherein Y is the D2D timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

11. The method of claim 1, further comprising:
beginning reception of a D2D signal from a reception start point, the reception start point based on the propagated start point and a D2D timing receiving timeline offset (RTLO).

12. The method of claim 11, wherein:
the RTLO is provided by the following equation when the cellular communication system is deployed as a heterogeneous network and the at least one time-frequency resource to be used for D2D communication is embedded in downlink resources of the cellular communication system:

$$RTLO=X+T_C+T_D,$$

wherein X is the timing offset, $T_C$ is a maximum expected propagation delay of the cellular communication system, and $T_D$ is a maximum expected propagation delay between D2D devices.

13. The method of claim 11, wherein:
the RTLO is provided by the following equation when the cellular communication system is deployed as a heterogeneous network and the at least one time-frequency resource to be used for D2D communication is embedded in uplink resources of the cellular communication system:

$$RTLO=X+T_C+T_D,$$

wherein X is the timing offset, $T_C$ is a maximum expected propagation delay of the cellular communication system, and $T_D$ is a maximum expected propagation delay between D2D devices.

14. The method of claim 11, wherein:
the RTLO is provided by the following equation when the cellular communication system is deployed as a homogeneous network and the at least one time-frequency resource to be used for D2D communication is embedded in downlink resources of the cellular communication system:

$$RTLO=X+(2-\sqrt{3})*T_C+2*T_D,$$

wherein X is the timing offset, $T_C$ is a maximum expected propagation delay of the cellular communication system, and $T_D$ is a maximum expected propagation delay between D2D devices.

15. The method of claim 11, wherein:
the RTLO is provided by the following equation when the cellular communication system is deployed as a homogeneous network and the at least one time-frequency resource to be used for D2D communication is embedded in uplink resources of the cellular communication system:

$$RTLO=X+(2-\sqrt{3})*T_C+2*T_D,$$

wherein X is the timing offset, $T_C$ is a maximum expected propagation delay of the cellular communication system, and $T_D$ is a maximum expected propagation delay between D2D devices.

16. The method of claim 1, wherein a length of a portion of the at least one time-frequency resource is equal to a sum of a cyclic prefix length (CPL) of a respective resource and an inverse of a subcarrier spacing of the resources of the cellular communication system.

17. The method of claim 16, wherein:
the CPL is provided by the following equation when the cellular communication system is deployed as a heterogeneous network and the at least one time-frequency resource to be used for D2D communication is embedded in downlink resources of the cellular communication system:

$$CPL=2*T_C+T_D,$$

wherein $T_C$ is a maximum expected propagation delay of the cellular communication system and $T_D$ is a maximum expected propagation delay between D2D devices.

18. The method of claim 16, wherein:
the CPL is provided by the following equation when the cellular communication system is deployed as a heterogeneous network and the at least one time-frequency resource to be used for D2D communication is embedded in uplink resources of the cellular communication system:

$$CPL=2*T_C+T_D,$$

wherein $T_C$ is a maximum expected propagation delay of the cellular communication system and $T_D$ is a maximum expected propagation delay between D2D devices.

19. The method of claim 16, wherein:
the CPL is provided by the following equation when the cellular communication system is deployed as a homogeneous network and the at least one time-frequency resource to be used for D2D communication is embedded in downlink resources of the cellular communication system:

$$CPL=2*(2-\sqrt{3})*T_C+2*T_D,$$

wherein $T_C$ is a maximum expected propagation delay of the cellular communication system and $T_D$ is a maximum expected propagation delay between D2D devices.

20. The method of claim 9, wherein:
the CPL is provided by the following equation when the cellular communication system is deployed as a homogeneous network and the at least one time-frequency resource to be used for D2D communication is embedded in uplink resources of the cellular communication system:

$$CPL=2*(2-\sqrt{3})*T_C+2*T_D,$$

wherein $T_C$ is a maximum expected propagation delay of the cellular communication system and $T_D$ is a maximum expected propagation delay between D2D devices.

21. The method of claim 1, wherein the at least one time-frequency resource determined to be used for D2D communication is embedded among at least one of:
downlink resources of the cellular communication system; or
uplink resources of the cellular communication system.

22. The method of claim 1, wherein:
the timing offset is provided by the following equation when the cellular communication system is deployed as a heterogeneous network and the at least one time-frequency resource to be used for D2D communication is embedded in downlink resources of the cellular communication system:

$$X=\max(\text{delta1}, T_C),$$

wherein X is the timing offset, delta1 is a transient time for switching from downlink reception resources of the cellular communication system to the at least one time-frequency resource to be used for D2D transmission, and $T_C$ is a maximum expected propagation delay of the cellular communication system.

23. The method of claim 1, wherein:
the timing offset is provided by the following equation when the cellular communication system is deployed as a heterogeneous network and the at least one time-frequency resource to be used for D2D communication is embedded in uplink resources of the cellular communication system:

$$X=\text{delta3},$$

wherein X is the timing offset and delta3 is a transient time for switching from uplink transmission resources of the cellular communication system to the at least one time-frequency resource to be used for D2D reception.

24. The method of claim 1, wherein:
the timing offset is provided by the following equation when the cellular communication system is deployed as a homogeneous network and the at least one time-frequency resource to be used for D2D communication is embedded in downlink resources of the cellular communication system:

$$X=\max(\text{delta1}, (2-\sqrt{3})*T_C),$$

wherein X is the timing offset, delta1 is a transient time for switching from downlink reception resources of the cellular communication system to the at least one time-frequency resource to be used for D2D transmission, and $T_C$ is a maximum expected propagation delay of the cellular communication system.

25. The method of claim 1, wherein:
the timing offset is provided by the following equation when the cellular communication system is deployed as a homogeneous network and the at least one time-frequency resource to be used for D2D communication is embedded in uplink resources of the cellular communication system:

$$X=\text{delta3},$$

wherein X is the timing offset and delta3 is a transient time for switching from uplink transmission resources of the cellular communication system to the at least one time-frequency resource to be used for D2D reception.

26. The method of claim 1, wherein a D2D transmission duration L on the at least one time-frequency resource to be used for D2D communication is provided by the following equation:

$$L=n*SL.$$

27. The method of claim 1, wherein the timing advance is based on the propagation delay between the UE and the second UE.

28. The method of claim 27, wherein the timing advance is further based on the propagation delay between the UE and the base station.

29. The method of claim 28, wherein the timing advance is a first timing advance when the at least one time-frequency resource is embedded in downlink resources of the base station, and is a second timing advance when the at least one time-frequency resource is embedded in uplink resources of the base station, wherein the first timing advance is a function of the propagation delay between the UE and the second UE and the propagation delay between the UE and the base station, and the second timing advance is a function of the propagation delay between the UE and the second UE and twice the propagation delay between the UE and the base station.

30. The method of claim 1, wherein the timing offset is a first timing offset when the at least one time-frequency resource is embedded in downlink resources of the base station, and is a second timing offset when the at least one time-frequency resource is embedded in uplink resources of the base station, the first timing offset being based on a first transient switching time and the propagation delay between the UE and the base station, and the second timing offset being based on a second transient switching time.

31. The method of claim 30, wherein the second timing offset is unassociated with the propagation delay between the UE and the base station.

32. An apparatus for wireless communication in a cellular communication system, the apparatus being a user equipment (UE) and comprising:
means for identifying a propagated start point of a first portion of at least one time-frequency resource, wherein the propagated start point is based on a network start point of the first portion and one of a propagation delay or a propagation advance between the UE and a base station; and
means for transmitting a device-to-device (D2D) signal beginning from a transmission start point and ending at a transmission end point, the transmission start point being based on the propagated start point and addition of a timing offset to the propagated start point, the timing offset being based on a propagation delay between the UE and the base station when the at least one time-frequency resource is embedded in downlink resources of the base station, the transmission end point being based on subtraction of a timing advance from a propagated end point, the timing advance based on a propagation delay between the UE and a second UE, the addition of the timing offset causing the transmission of the D2D signal to start after the propagated start point and the subtraction of the timing advance causing the transmission of the D2D signal to end before the propagated end point, wherein a number of D2D symbols n transmitted on the at least one time-frequency resource to be used for D2D communication is provided by the following equation:

$$n=\lfloor (G-X-Y)/SL \rfloor,$$

wherein G is a difference between an allocated D2D resource end point and an allocated D2D resource start point, X is the timing offset, Y is a D2D timing advance, and SL is a symbol length.

33. The apparatus of claim 32, further comprising means for determining the at least one time-frequency resource among resources of a cellular communication system to be used for D2D communication.

34. The apparatus of claim 32, wherein the propagated start point is a UE start point of the first portion.

35. The apparatus of claim 32, further comprising:
means for identifying the propagated end point of a last portion of the at least one time-frequency resource; and
means for ending transmission of the D2D signal at a transmission end point, the transmission end point based on the propagated end point and the D2D timing advance to the propagated end point.

36. The apparatus of claim 35, wherein the propagated end point is a delayed version of a network end point of the last portion due to a propagation delay.

37. The apparatus of claim 35, wherein the propagated end point is a UE end point of the last portion.

38. The apparatus of claim 35, wherein:
the D2D timing advance is provided by the following equation when the cellular communication system is deployed as a heterogeneous network and the at least one time-frequency resource to be used for D2D communication is embedded in downlink resources of the cellular communication system:

$$Y = \max(\text{delta2}, T_C + T_D),$$

wherein Y is the D2D timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

39. The apparatus of claim 35, wherein:
the D2D timing advance is provided by the following equation when the cellular communication system is deployed as a heterogeneous network and the at least one time-frequency resource to be used for D2D communication is embedded in uplink resources of the cellular communication system:

$$Y = \text{delta4} + T_D + 2 * T_C,$$

wherein Y is the D2D timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

40. The apparatus of claim 35, wherein:
the D2D timing advance is provided by the following equation when the cellular communication system is deployed as a homogeneous network and the at least one time-frequency resource to be used for D2D communication is embedded in downlink resources of the cellular communication system:

$$Y = \max(\text{delta2}, (2-\sqrt{3}) * T_C + 2 * T_D),$$

wherein Y is the D2D timing advance, delta2 is a transient time for switching from the at least one time-frequency resource to be used for D2D transmission to downlink reception resources of the cellular communication system, $T_C$ is a maximum expected propagation delay of the cellular communication system, and $T_D$ is a maximum expected propagation delay between D2D devices.

41. The apparatus of claim 35, wherein:
the D2D timing advance is provided by the following equation when the cellular communication system is deployed as a homogeneous network and the at least one time-frequency resource to be used for D2D communication is embedded in uplink resources of the cellular communication system:

$$Y = \text{delta4} + T_D + 2 * T_C,$$

wherein Y is the D2D timing advance, delta4 is a transient time for switching from the at least one time-frequency resource to be used for D2D reception to uplink transmission resources of the cellular communication system, $T_C$ is a maximum expected propagation delay of the cellular communication system, and $T_D$ is a maximum expected propagation delay between D2D devices.

42. The apparatus of claim 32, further comprising:
means for beginning reception of a D2D signal from a reception start point, the reception start point based on the propagated start point and a cellular communication system downlink-D2D timing receiving timeline offset (RTLO).

43. The apparatus of claim 42, wherein:
the RTLO is provided by the following equation when the cellular communication system is deployed as a heterogeneous network and the at least one time-frequency resource to be used for D2D communication is embedded in downlink resources of the cellular communication system:

$$RTLO = X + T_C + T_D,$$

wherein X is the timing offset, $T_C$ is a maximum expected propagation delay of the cellular communication system, and $T_D$ is a maximum expected propagation delay between D2D devices.

44. The apparatus of claim 42, wherein:
the RTLO is provided by the following equation when the cellular communication system is deployed as a heterogeneous network and the at least one time-frequency resource to be used for D2D communication is embedded in uplink resources of the cellular communication system:

$$RTLO = X + T_C + T_D,$$

wherein X is the timing offset, $T_C$ is a maximum expected propagation delay of the cellular communication system, and $T_D$ is a maximum expected propagation delay between D2D devices.

45. The apparatus of claim 42, wherein:
the RTLO is provided by the following equation when the cellular communication system is deployed as a homogeneous network and the at least one time-frequency resource to be used for D2D communication is embedded in downlink resources of the cellular communication system:

$$RTLO = X + (2-\sqrt{3}) * T_C + 2 * T_D,$$

wherein X is the timing offset, $T_C$ is a maximum expected propagation delay of the cellular communication system, and $T_D$ is a maximum expected propagation delay between D2D devices.

46. The apparatus of claim 42, wherein:
the RTLO is provided by the following equation when the cellular communication system is deployed as a homogeneous network and the at least one time-frequency resource to be used for D2D communication is embedded in uplink resources of the cellular communication system:

$$RTLO = X + (2-\sqrt{3}) * T_C + 2 * T_D,$$

wherein X is the timing offset, $T_C$ is a maximum expected propagation delay of the cellular communication system, and $T_D$ is a maximum expected propagation delay between D2D devices.

47. The apparatus of claim 32, wherein a length of a portion of the at least one time-frequency resource is equal to a sum of a cyclic prefix length (CPL) of a respective resource and an inverse of a subcarrier spacing of the resources of the cellular communication system.

48. The apparatus of claim 47, wherein:
the CPL is provided by the following equation when the cellular communication system is deployed as a heterogeneous network and the at least one time-frequency resource to be used for D2D communication is embedded in downlink resources of the cellular communication system:

$$CPL=2*T_C+T_D,$$

wherein $T_C$ is a maximum expected propagation delay of the cellular communication system and $T_D$ is a maximum expected propagation delay between D2D devices.

49. The apparatus of claim 47, wherein:
the CPL is provided by the following equation when the cellular communication system is deployed as a heterogeneous network and the at least one time-frequency resource to be used for D2D communication is embedded in uplink resources of the cellular communication system:

$$CPL=2*T_C+T_D,$$

wherein $T_C$ is a maximum expected propagation delay of the cellular communication system and $T_D$ is a maximum expected propagation delay between D2D devices.

50. The apparatus of claim 47, wherein:
the CPL is provided by the following equation when the cellular communication system is deployed as a homogeneous network and the at least one time-frequency resource to be used for D2D communication is embedded in downlink resources of the cellular communication system:

$$CPL=2*(2-\sqrt{3})*T_C+2*T_D,$$

wherein $T_C$ is a maximum expected propagation delay of the cellular communication system and $T_D$ is a maximum expected propagation delay between D2D devices.

51. The apparatus of claim 47, wherein:
the CPL is provided by the following equation when the cellular communication system is deployed as a homogeneous network and the at least one time-frequency resource to be used for D2D communication is embedded in uplink resources of the cellular communication system:

$$CPL=2*(2-\sqrt{3})*T_C+2*T_D,$$

wherein $T_C$ is a maximum expected propagation delay of the cellular communication system and $T_D$ is a maximum expected propagation delay between D2D devices.

52. The apparatus of claim 32, wherein the at least one time-frequency resource determined to be used for D2D communication is embedded among at least one of:
downlink resources of the cellular communication system; or
uplink resources of the cellular communication system.

53. The apparatus of claim 32, wherein:
the timing offset is provided by the following equation when the cellular communication system is deployed as a heterogeneous network and the at least one time-frequency resource to be used for D2D communication is embedded in downlink resources of the cellular communication system:

$$X=\max(\text{delta1},T_C),$$

wherein X is the timing offset, delta1 is a transient time for switching from downlink reception resources of the cellular communication system to the at least one time-frequency resource to be used for D2D transmission, and $T_C$ is a maximum expected propagation delay of the cellular communication system.

54. The apparatus of claim 32, wherein:
the timing offset is provided by the following equation when the cellular communication system is deployed as a heterogeneous network and the at least one time-frequency resource to be used for D2D communication is embedded in uplink resources of the cellular communication system:

$$X=\text{delta3},$$

wherein X is the timing offset and delta3 is a transient time for switching from uplink transmission resources of the cellular communication system to the at least one time-frequency resource to be used for D2D reception.

55. The apparatus of claim 32, wherein:
the timing offset is provided by the following equation when the cellular communication system is deployed as a homogeneous network and the at least one time-frequency resource to be used for D2D communication is embedded in downlink resources of the cellular communication system:

$$X=\max(\text{delta1},(2-\sqrt{3})*T_C),$$

wherein X is the timing offset, delta1 is a transient time for switching from downlink reception resources of the cellular communication system to the at least one time-frequency resource to be used for D2D transmission, and $T_C$ is a maximum expected propagation delay of the cellular communication system.

56. The apparatus of claim 32, wherein:
the timing offset is provided by the following equation when the cellular communication system is deployed as a homogeneous network and the at least one time-frequency resource to be used for D2D communication is embedded in uplink resources of the cellular communication system:

$$X=\text{delta3},$$

wherein X is the timing offset and delta3 is a transient time for switching from uplink transmission resources of the cellular communication system to the at least one time-frequency resource to be used for D2D reception.

57. The apparatus of claim 32, wherein a D2D transmission duration L on the at least one time-frequency resource to be used for D2D communication is provided by the following equation:

$$L=n*SL.$$

58. The apparatus of claim 32, wherein timing advance is based on the propagation delay between the UE and the second UE.

59. The apparatus of claim 58, wherein the timing advance is further based on the propagation delay between the UE and the base station.

60. The apparatus of claim 59, wherein the timing advance is a first timing advance when the at least one time-frequency resource is embedded in downlink resources of the base station, and is a second timing advance when the at least one time-frequency resource is embedded in uplink resources of the base station, wherein the first timing advance is a function of the propagation delay between the UE and the second UE and the propagation delay between the UE and the base station, and the second timing advance is a function of the propagation delay between the UE and the second UE and twice the propagation delay between the UE and the base station.

61. The apparatus of claim 32, wherein the timing offset is a first timing offset when the at least one time-frequency resource is embedded in downlink resources of the base station, and is a second timing offset when the at least one time-frequency resource is embedded in uplink resources of the base station, the first timing offset being based on a first transient switching time and the propagation delay between the UE and the base station, and the second timing offset being based on a second transient switching time.

62. The apparatus of claim 61, wherein the second timing offset is unassociated with the propagation delay between the UE and the base station.

63. An apparatus for wireless communication in a cellular communication system, the apparatus being a user equipment (UE) and comprising:
a memory; and
at least one processor coupled to the memory and configured to:
identify a propagated start point of a first portion of at least one time-frequency resource, wherein the propagated start point is based on a network start point of the first portion and one of a propagation delay or a propagation advance between the UE and a base station; and
transmit a device-to-device (D2D) signal beginning from a transmission start point and ending at a transmission end point, the transmission start point being based on the propagated start point and addition of a timing offset to the propagated start point, the timing offset being based on a propagation delay between the UE and the base station when the at least one time-frequency resource is embedded in downlink resources of the base station, the transmission end point being based on subtraction of a timing advance from a propagated end point, the timing advance based on a propagation delay between the UE and a second UE, the addition of the timing offset causing the transmission of the D2D signal to start after the propagated start point and the subtraction of the timing advance causing the transmission of the D2D signal to end before the propagated end point, wherein a number of D2D symbols n transmitted on the at least one time-frequency resource to be used for D2D communication is provided by the following equation:

$$n=\lfloor (G-X-Y)/SL \rfloor,$$

wherein G is a difference between an allocated D2D resource end point and an allocated D2D resource start point, X is the timing offset, Y is a D2D timing advance, and SL is a symbol length.

64. The apparatus of claim 63, the at least one processor further configured to determine the at least one time-frequency resource among resources of a cellular communication system to be used for D2D communication.

65. The apparatus of claim 63, wherein the propagated start point is a UE start point of the first portion.

66. The apparatus of claim 63, the at least one processor further configured to:

identify the propagated end point of a last portion of the at least one time-frequency resource; and
end transmission of the D2D signal at a transmission end point, the transmission end point based on the propagated end point and the D2D timing advance to the propagated end point.

67. The apparatus of claim 66, wherein the propagated end point is a delayed version of a network end point of the last portion due to a propagation delay.

68. The apparatus of claim 66, wherein the propagated end point is a UE end point of the last portion.

69. The apparatus of claim 63, the at least one processor further configured to:
begin reception of a D2D signal from a reception start point, the reception start point based on the propagated start point and a D2D timing receiving timeline offset (RTLO).

70. The apparatus of claim 63, wherein a length of a portion of the at least one time-frequency resource is equal to a sum of a cyclic prefix length (CPL) of a respective resource and an inverse of a subcarrier spacing of the resources of the cellular communication system.

71. The apparatus of claim 63, wherein the at least one time-frequency resource determined to be used for D2D communication is embedded among at least one of:
downlink resources of the cellular communication system; or
uplink resources of the cellular communication system.

72. The apparatus of claim 63, wherein the timing advance is based on the propagation delay between the UE and the second UE.

73. The apparatus of claim 72, wherein the timing advance is further based on the propagation delay between the UE and the base station.

74. The apparatus of claim 73, wherein the timing advance is a first timing advance when the at least one time-frequency resource is embedded in downlink resources of the base station, and is a second timing advance when the at least one time-frequency resource is embedded in uplink resources of the base station, wherein the first timing advance is a function of the propagation delay between the UE and the second UE and the propagation delay between the UE and the base station, and the second timing advance is a function of the propagation delay between the UE and the second UE and twice the propagation delay between the UE and the base station.

75. The apparatus of claim 63, wherein the timing offset is a first timing offset when the at least one time-frequency resource is embedded in downlink resources of the base station, and is a second timing offset when the at least one time-frequency resource is embedded in uplink resources of the base station, the first timing offset being based on a first transient switching time and the propagation delay between the UE and the base station, and the second timing offset being based on a second transient switching time.

76. The apparatus of claim 75, wherein the second timing offset is unassociated with the propagation delay between the UE and the base station.

77. A non-transitory computer-readable medium storing computer executable code for communication in a cellular communication system, comprising code to:
identify, by a user equipment (UE), a propagated start point of a first portion of at least one time-frequency resource, wherein the propagated start point is based on a network start point of the first portion and one of a propagation delay or a propagation advance between the UE and a base station; and transmit, by the UE, a device-to-device (D2D) signal beginning from a transmission start point and ending at a transmission end point, the transmission start point being based on the propagated start point and addition of a timing offset to the propagated start point, the timing offset being based on a propagation delay between the UE and the base station when the at least one time-frequency resource is embedded in downlink resources of the base station, the transmission end point being based on subtraction of a timing advance from a propagated end point, the timing advance based on a propagation delay between the UE and a second UE, the addition of the timing offset causing the transmission of the D2D signal to start after the propagated start point and the subtraction of the timing advance causing the transmission of the D2D signal to end before the propagated end point, wherein a number of D2D symbols n transmitted on the at least one time-frequency resource to be used for D2D communication is provided by the following equation:

$$n=\lfloor (G-X-Y)/SL \rfloor,$$

wherein G is a difference between an allocated D2D resource end point and an allocated D2D resource start point, X is the timing offset, Y is a D2D timing advance, and SL is a symbol length.

78. The non-transitory computer-readable medium of claim 77, further comprising code to determine the at least one time-frequency resource among resources of a cellular communication system to be used for D2D communication.

79. The non-transitory computer-readable medium of claim 77, wherein the propagated start point is a UE start point of the first portion.

80. The non-transitory computer-readable medium of claim 77, further comprising code to:

identify the propagated end point of a last portion of the at least one time-frequency resource; and end transmission of the D2D signal at a transmission end point, the transmission end point based on the propagated end point and the D2D timing advance to the propagated end point.

81. The non-transitory computer-readable medium of claim 80, wherein the propagated end point is a delayed version of a network end point of the last portion due to a propagation delay.

82. The non-transitory computer-readable medium of claim 80, wherein the propagated end point is a UE end point of the last portion.

83. The non-transitory computer-readable medium of claim 77, further comprising code to:

begin reception of a D2D signal from a reception start point, the reception start point based on the propagated start point and a D2D timing receiving timeline offset (RTLO).

84. The non-transitory computer-readable medium of claim 77, wherein a length of one of the at least one time-frequency resource is equal to a sum of a cyclic prefix length (CPL) of a respective resource and an inverse of a subcarrier spacing of the resources of the cellular communication system.

85. The non-transitory computer-readable medium of claim 77, wherein the at least one time-frequency resource determined to be used for D2D communication is embedded among at least one of:

downlink resources of the cellular communication system; or uplink resources of the cellular communication system.

* * * * *